United States Patent [19]

Rupnick et al.

[11] Patent Number: 5,182,949
[45] Date of Patent: Feb. 2, 1993

[54] ACCELEROMETER WITH SUPPORT CAGING

[75] Inventors: Charles J. Rupnick; Damon R. Stoddard, both of Seattle; David B. Grindeland, Bellevue, all of Wash.

[73] Assignee: Sundstrand Corporation, Rockford, Ill.

[21] Appl. No.: 702,271

[22] Filed: May 17, 1991

[51] Int. Cl.$^5$ .............................................. G01P 15/08
[52] U.S. Cl. ................................. 73/517 B; 73/514; 73/526
[58] Field of Search ................ 73/517 B, 517 R, 497, 73/514, 526, 517 AV

[56] References Cited

U.S. PATENT DOCUMENTS

| | | | |
|---|---|---|---|
| 4,854,169 | 8/1989 | Sakuma et al. | 73/517 B |
| 4,926,689 | 5/1990 | Hanson | 73/517 B |
| 4,932,258 | 6/1990 | Norling | 73/517 B |

Primary Examiner—John E. Chapman
Attorney, Agent, or Firm—Fitch, Even, Tabin & Flannery

[57] ABSTRACT

An improved accelerometer of the type that comprises a paddle (30), a support (32), and suspension means (34) for suspending the paddle from the support, such that the paddle can move along a sensing axis. The support includes an unclamped portion (42) to which the suspension means is attached, and a clamped portion (40) through which the support is mounted. The invention provides restraining means (72, 100, 120, 132, 134, 176, 196, 206) separate from the clamped portion of the support, for limiting the travel of the unclamped portion in directions normal to the sensing axis, for example, along the hinge axis. The result is an accelerometer able to withstand higher cross axis shocks without failure.

12 Claims, 7 Drawing Sheets

ACCELEROMETER WITH SUPPORT CAGING

FIELD OF THE INVENTION

The present invention relates to accelerometers in which a proof mass is suspended from a support ring or the like, for movement along a sensing axis.

BACKGROUND OF THE INVENTION

A prior art accelerometer with high performance potential is described in U.S. Pat. No. 3,702,073. The accelerometer comprises three primary components, a proof mass assembly, and upper and lower stators or magnetic circuits between which the proof mass assembly is secured. The proof mass assembly includes a movable paddle that is suspended by flexures from a support ring that extends around the paddle, such that the paddle can pivot with respect to the support ring about a hinge axis that passes through the flexures. The paddle, flexures and support ring may be fabricated as a unitary structure composed of fused quartz. A plurality of mounting pads are formed on the upper and lower surfaces of the support ring. These mounting pads contact inwardly facing surfaces of the upper and lower stators when the accelerometer is assembled.

In the accelerometer of U.S. Pat. No. 3,702,073, each stator includes a permanent magnet, and each surface of the paddle has a force balancing coil mounted on it. Current flowing through each coil produces a magnetic field that interacts with the permanent magnet of the associated stator, to produce a force on the paddle. By controlling the electrical currents supplied to the coils, one can control the magnitude and direction of this force. The upper and lower paddle surfaces also include capacitor plates configured to form capacitors with capacitor plates on the inwardly facing surfaces of the stators. Movement of the paddle with respect to the upper and lower stators results in a differential capacitance change that can be sensed to determine the paddle position.

In operation, the accelerometer is affixed to an object whose acceleration is to be measured. Acceleration of the object along a sensing axis normal to the paddle results in rotation of the paddle about the hinge axis with respect to the support ring and stators. The resulting differential capacitance change caused by this movement is sensed by a feedback circuit. In response, the feedback circuit produces a current that, when applied to the force balancing coils, produces a force that tends to return the paddle to its neutral position. The magnitude of the current required to maintain the paddle in its neutral position provides a measure of the acceleration along the sensing axis.

In a second type of prior art accelerometer, the coils and capacitor plates are replaced by one or more force sensing elements connected between the paddle or proof mass and a fixed support. When the object to which the accelerometer is affixed accelerates along the sensing axis, the paddle movement produces a force that is detected by the force sensing elements. The output signals of the force sensing elements may then be processed to provide a measure of the acceleration.

In accelerometers of the types described above, in which a support ring is secured between upper and lower stators or other mounting members, it is often desirable to clamp the support ring only at that portion of the ring that is spaced away from the flexures, so that the portion of the support ring adjacent the flexures is not directly clamped. The advantage of such a support technique is that stresses exerted on the proof mass assembly by the stators are not directly transmitted to the flexures, where they could cause bias errors.

When accelerometers are used in environments in which they may be subjected to high acceleration impacts, such as in oil field survey equipment, provisions must generally be made to prevent such impacts from fracturing the flexures, or from otherwise damaging the accelerometer. For example, along the sensitive axis of the accelerometer, shock stops are commonly provided to prevent excessive motion of the paddle along the sensitive axis. In cross axis directions, i.e., in directions normal to the sensing axis, it has been known to provide a pin that is attached to a stator or other support, and that passes through an opening in the paddle. The opening is sized such that the paddle is allowed limited travel in cross axis directions, and in particular along the hinge axis of the accelerometer, to thereby protect the flexures from breakage. However, despite such measures, it has been found that such accelerometers remain subject to failure after extended use in the field. Two particular types of failures that have been noted are breakage of the flexures, and of the unclamped portion of the support ring in the general area of the flexures. An additional failure mode involves breakage of the thin wires that extend from pins fixed within the accelerometer onto the unsupported support rim portion, for conducting signals to and from the coils and capacitor plates.

SUMMARY OF THE INVENTION

The present invention provides an accelerometer in which motion restraining means are provided for the unsupported portion of the support ring. The restraining means prevents cross axis shocks from causing excessive motion of the support ring, and solves the failure problems described above.

In a preferred embodiment, the present invention provides an accelerometer for measuring acceleration along a sensing axis. The accelerometer comprises a proof mass assembly that includes a paddle, a support, and suspension means for suspending the paddle from the support such that the paddle can move along the sensing axis in response to acceleration. The support includes an unclamped portion to which the suspension means is attached, and a clamped portion through which the support is mounted. In the context of the present invention, "unclamped" means that this portion of the support can move to some extent in directions normal to the sensing axis. To restrain or limit such motion, the present invention provides restraining means separate from the clamped portion of the support, for limiting the travel of the unclamped portion in directions normal to the sensing axis. In a preferred embodiment, the suspension means suspends the paddle for rotation about a hinge axis normal to the sensing axis, and the restraining means restrains motion of the unclamped portion of the support along the hinge axis.

DETAILED DESCRIPTION OF THE INVENTION

Figures 1, 2, 3, 4:
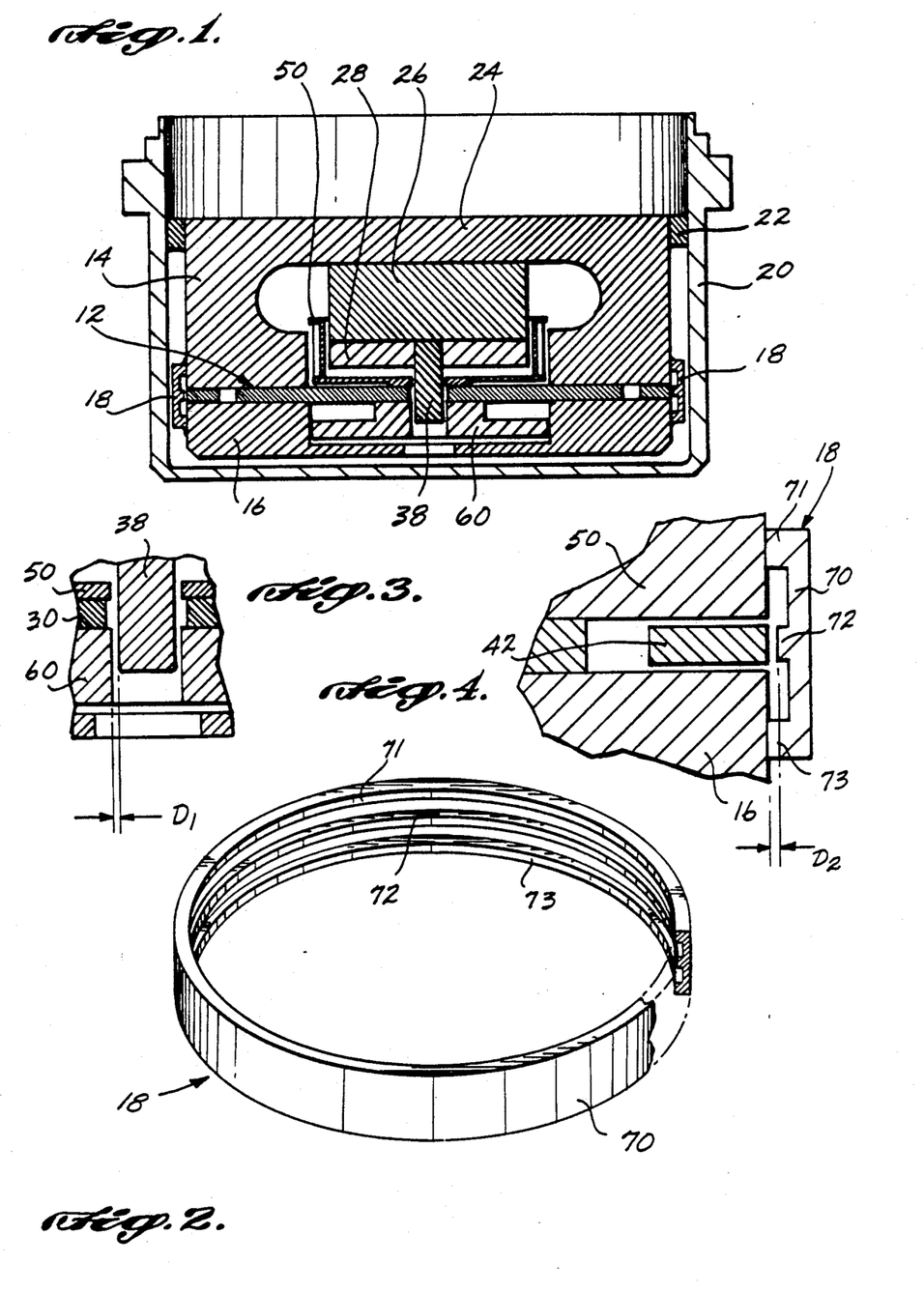
FIG. 1 is a cross-sectional view of an accelerometer that includes a first preferred embodiment of the restraining means of the present invention.
FIG. 2 is a perspective of the belly band, showing the restraining means.
FIG. 3 is a partial view illustrating the paddle caging.
FIG. 4 is a partial view showing the support ring caging.

FIGS. 1-5 illustrate an accelerometer that includes a first preferred embodiment of the present invention. Referring initially to FIG. 1, the accelerometer comprises proof mass assembly 12 that is clamped between stator 14 and plate 16. The proof mass assembly, stator and plate are held together by "belly band" 18 that is shown in greater detail in FIG. 2. Stator 14 is mounted within case 20 by spacer ring 22 and epoxy. The stator comprises magnetic circuit assembly 24, magnet 26 and pole piece 28.

Figure 5:
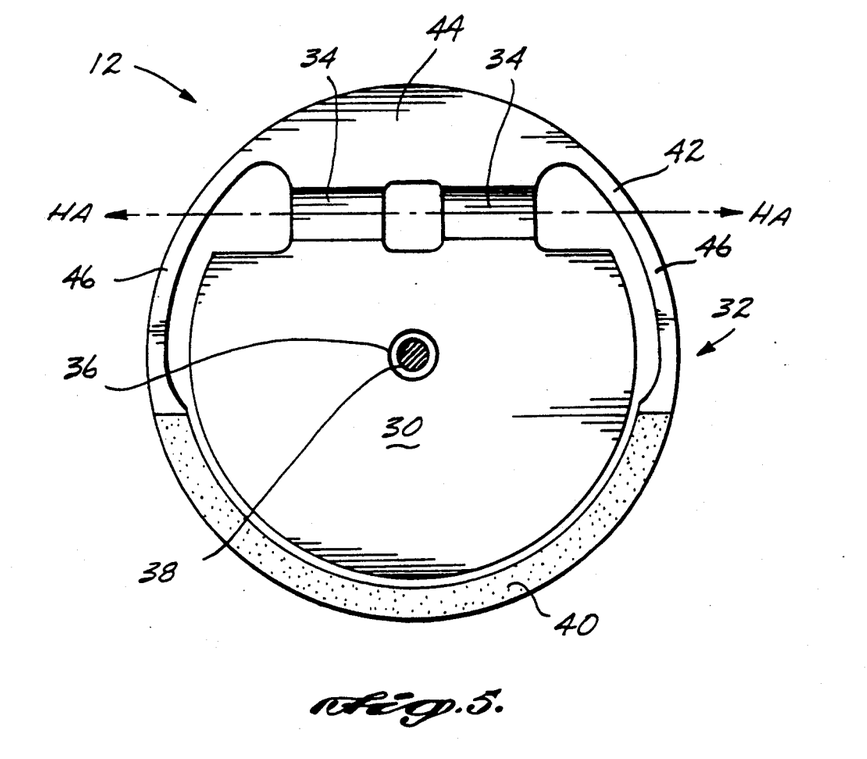
FIG. 5 is a plan view of the proof mass assembly of the accelerometer of FIG. 1.

As shown in FIG. 5, proof mass assembly 12 comprises paddle or proof mass 30 that is mounted to support ring 32 by flexures 34. The paddle includes a central opening 36 through which a pin 38 extends, as further described below. The flexures permit the paddle to rotate with respect to support ring 32 about hinge axis HA that passes through the flexures. The entire proof mass assembly 12 is preferably formed as a unitary structure, for example by etching a wafer of amorphous quartz.

Support ring 32 comprises a clamped portion 40, and an unclamped portion 42 that is thinner than clamped portion 40 in a direction normal to the plane of the drawing in FIG. 5. Thus when proof mass assembly 12 is secured between stator 14 and plate 16, the stator and plate contact support ring 32 only at clamped portion 40. Because of its reduced thickness, unclamped portion 42 is suspended between the stator and plate, but does not contact these structures. Unclamped portion 42 includes central area 44 to which flexures 34 are attached, and arms 46 that connect the central area to clamped support ring portion 40.

Returning again to FIG. 1, coil 50 is mounted to the upper surface of paddle 30. The coil is cylindrical in shape, and occupies a cylindrical gap between magnetic circuit assembly 24 and pole piece 28. When electrical current is passed through the coil, the current in the coil interacts electromagnetically with the magnetic field of magnet 26, to produce an upward or downward force on the coil, and therefore on the paddle. The lower surface of the paddle includes counterweight 60 that is provided to counterbalance the coil. Current is supplied to the coil by thin conductive strips (not shown) that extend from central area 44 of the support ring to the paddle, across flexures 34. Such current is provided to central area 44 by thin wires (also not shown) that are bonded to the central area. Similar wires may also carry electrical signals to the proof mass assembly, for use in capacitive or other systems for sensing paddle position. As previously mentioned, these wires have been found subject to breakage when accelerometers are used in rugged environments.

Pin 38 is mounted in pole piece 28, and extends downwardly through opening 36 in paddle 30, and through aligned openings in coil 50 and counterweight 60. The diameter of the opening in counterweight 60 is slightly smaller than the diameters of the corresponding openings in the coil and paddle, such that counterweight 60 serves as a shock or caging stop for the paddle. In particular, paddle 30 and its attached structures can move laterally for a distance $D_1$ (FIG. 3), at which point the counterweight will contact pin 38, stopping further lateral movement. This arrangement helps to protect the proof mass assembly from breakage under the influence of strong lateral shocks. However as previously mentioned, despite this protection, it has been found that accelerometers are nevertheless subject to failure when used in extremely rugged environments. The failure modes include breakage of the flexures and of the unclamped portion 42 of the support ring, and breakage of the wires used to electrically connect the proof mass assembly to other portions of the accelerometer.

FIGS. 2 and 4 illustrate a preferred embodiment of the motion restraining means of the present invention. Belly band 18 comprises an elongated ring 70 from which legs 71 and 73 and restraining member 72 protrude in an inward direction. Legs 71 and 73 are of equal length, and contact magnetic circuit assembly 24 and plate 16, respectively, to thereby provide the force to hold these components and the proof mass assembly together. Restraining member 72 is shorter than legs 71 and 73, and is spaced a distance $D_2$ from unclamped portion 42 of support ring 32. Referring again to FIG. 5, when the accelerometer is subjected to a shock directed along hinge axis HA, there will be a tendency for paddle 30, flexures 34, and unclamped portion 42 to move laterally along the hinge axis in response to such a shock. Restraining member 72 provides a shock stop for the unclamped position of the support ring, to limit its motion and prevent breakage of the proof mass assembly under such a shock. The section of restraining member 72 to the right of the proof mass assembly in FIG. 1 limits rightward motion, while the portion of restraining member 72 to the left of the proof mass assembly limits leftward motion. These two restraints are sufficient to limit the motion of the unclamped portion of the support ring in either direction along the hinge axis. More generally, the restraining member limits all motion of the unclamped support ring portion normal to the sensing axis of the accelerometer. Preferably, gap $D_2$ is approximately equal to gap $D_1$, shown in FIG. 3, such that the paddle and the support ring are limited to approximately the same range of motion. This limiting of the range of motion of the support ring in turn limits the level of stress in unclamped portion 42 of support ring 32, and limits the level of stress in the wires electrically connecting the conductive areas of central area 44 and fixed pins within the accelerometer.

Figure 6:
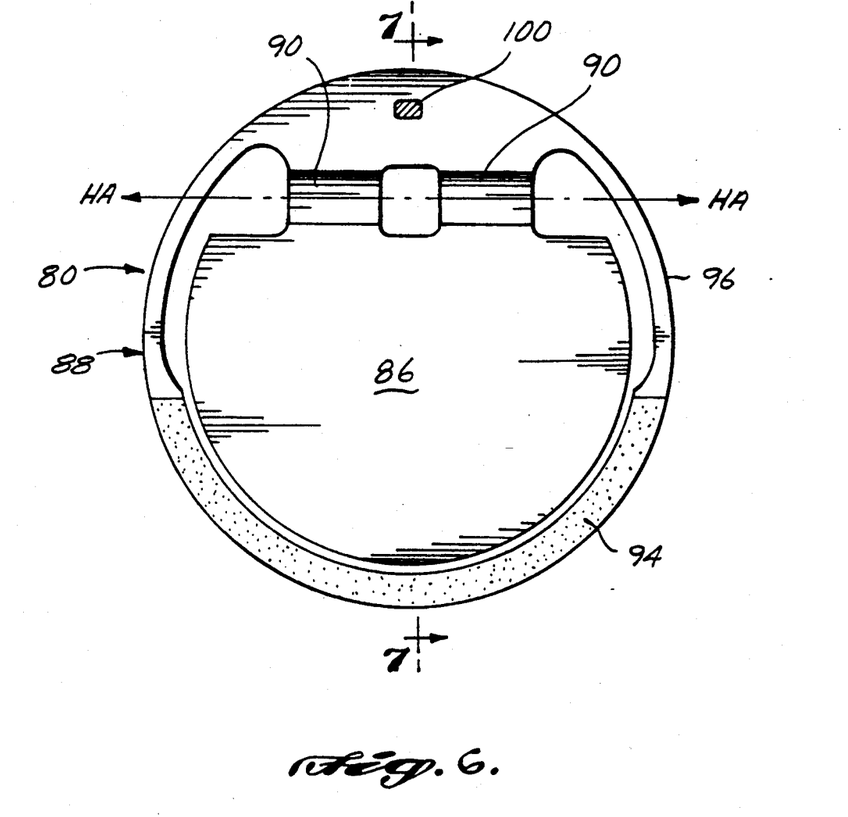
FIG. 6 is a plan view of a proof mass assembly for a second embodiment of the invention.
Figure 7:
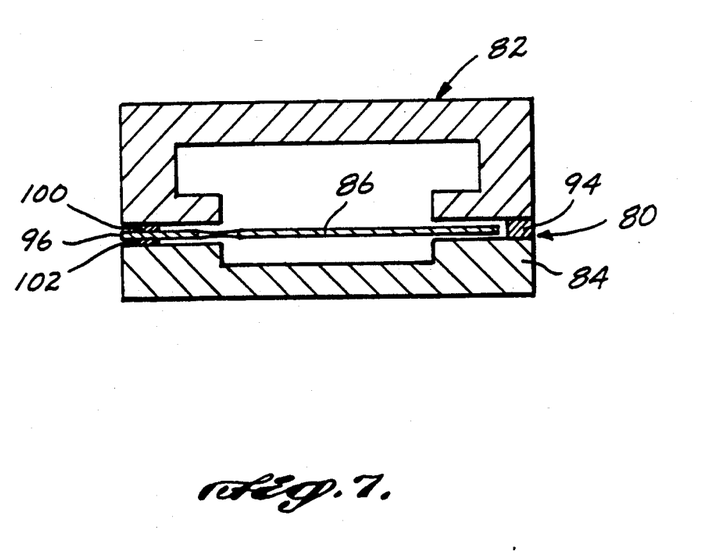
FIG. 7 is a schematic cross-sectional view taken along the line 7—7 of FIG. 6.

A second embodiment of the invention is illustrated in FIGS. 6 and 7. This embodiment includes proof mass assembly 80 mounted between stator 82 and plate 84. The proof mass assembly includes paddle 86 mounted from support ring 88 by flexures 90. Support ring 88 includes clamped portion 94 that is secured between the stator and plate, and unclamped portion 96 that is suspended between the support ring and plate by clamped portion 94.

In this embodiment, the motion restraining means comprises a pair of blocks 100 and 102 of a resilient material such as an adhesive elastomer. Block 100 extends between the upper surface of unclamped portion 96 and stator 82, while block 102 extends between the lower surface of unclamped portion 96 and plate 84. In general, blocks 100 and 102 may be applied to either or both surfaces of the unclamped support ring portion. The blocks may be bonded to both the support ring and the adjacent structure, or may be bonded to one or the other but not both. In the latter case, the friction between the blocks and the adjacent structures to which it is not bonded is controlled to provide the appropriate motion restraint. In the first case, the elasticity of the blocks provides the motion restraint.

Figure 8:
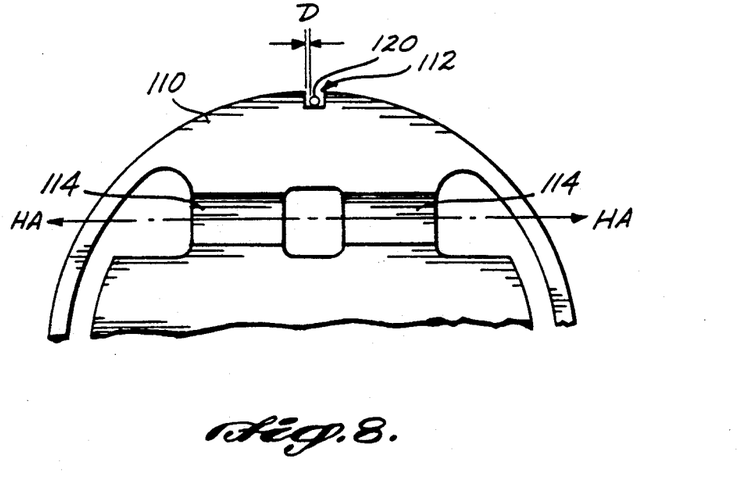
FIG. 8 is a plan view of the proof mass assembly for a third embodiment of the invention.

A third embodiment of the invention is illustrated in FIG. 8. In this embodiment, unclamped support ring portion 110 includes a notch 112 positioned directly opposite the flexures 114. A pin 120 mounted to either the stator or plate (or both) extends through notch 112, such that a clearance D exists between pin 120 and either side of the opening defining the notch. Pin 120 thus provides motion restraint for movement of unclamped support ring portion 110 along hinge HA. Notch 112 can have any shape that provides the desired clearance.

Figure 9:
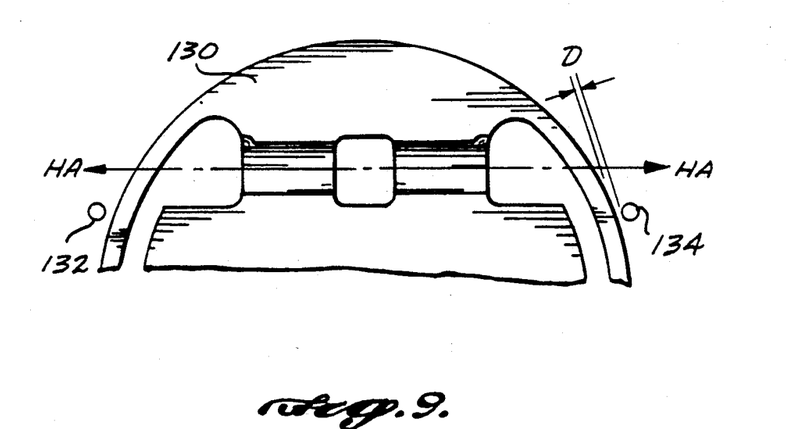
FIG. 9 is a plan view of the proof mass assembly for a fourth embodiment of the invention.

A fourth embodiment of the invention is illustrated in FIG. 9. In this arrangement, the motion of unclamped support ring portion 130 is restrained by pins 132 and 134 positioned on opposite sides of unclamped portion 130. As in the embodiment of FIG. 8, the pins are mounted to either the stator or to the plate, or to both. A clearance of D is provided between pins 132 and 134 and the support ring, to provide the appropriate motion restraint.

Figure 10:
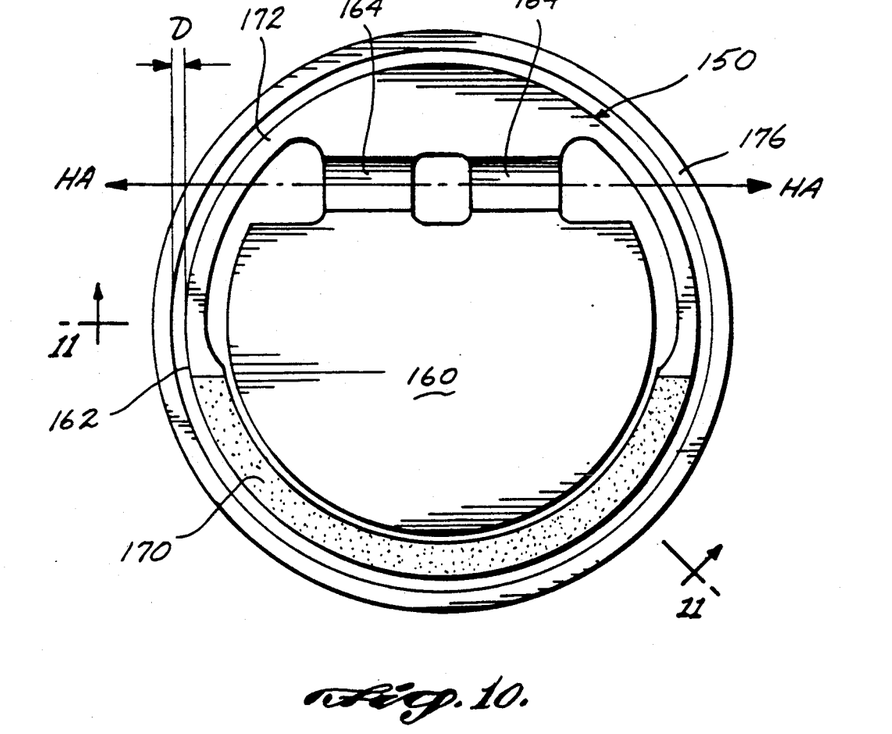
FIG. 10 is a plan view of the proof mass assembly for a fifth embodiment of the invention.
Figure 11:
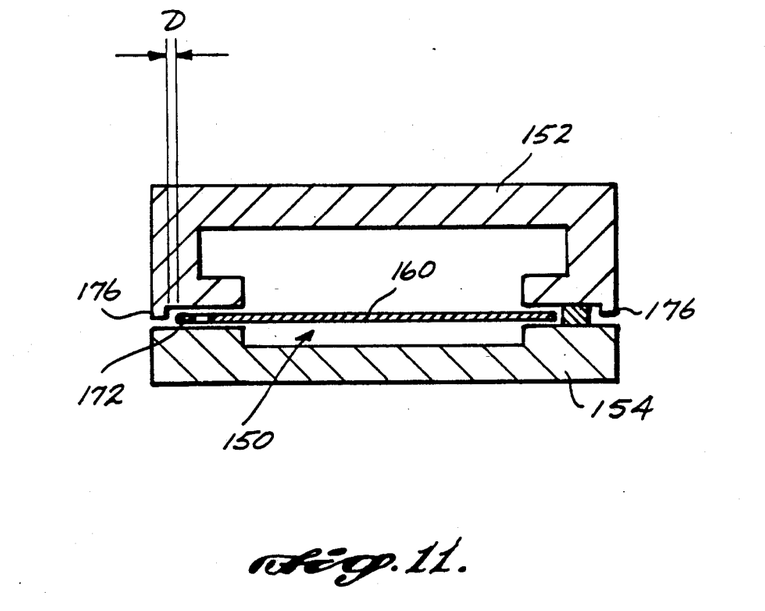
FIG. 11 is a schematic cross-sectional view taken along the line 11—11 of FIG. 10.

A further embodiment of the invention is partially illustrated in schematic form in FIGS. 10 and 11. In this embodiment, proof mass assembly 150 is mounted between stator 152 and plate 154. The proof mass assembly comprises paddle 160 suspended from support ring 162 by flexures 164. As with previous embodiments, support ring 162 includes clamped portion 170 that contacts the stator and plate, and unclamped portion 172.

Stator 152 includes downwardly projecting rim 176 that extends around the outer periphery of the proof mass assembly, and in particular of support ring 162. Where rim 176 is adjacent to unclamped support ring portion 172, the rim provides a motion restraint for the unclamped portion. The clearance D between rim 176 and unclamped portion 172 is again adjusted to provide the appropriate motion restraint. Alternatively, downward projecting rim 176 that extends around the outer periphery of the proof mass assembly, and in particular of support ring 162, may project upwardly from plate 154 to produce an identical result.

Figure 12:
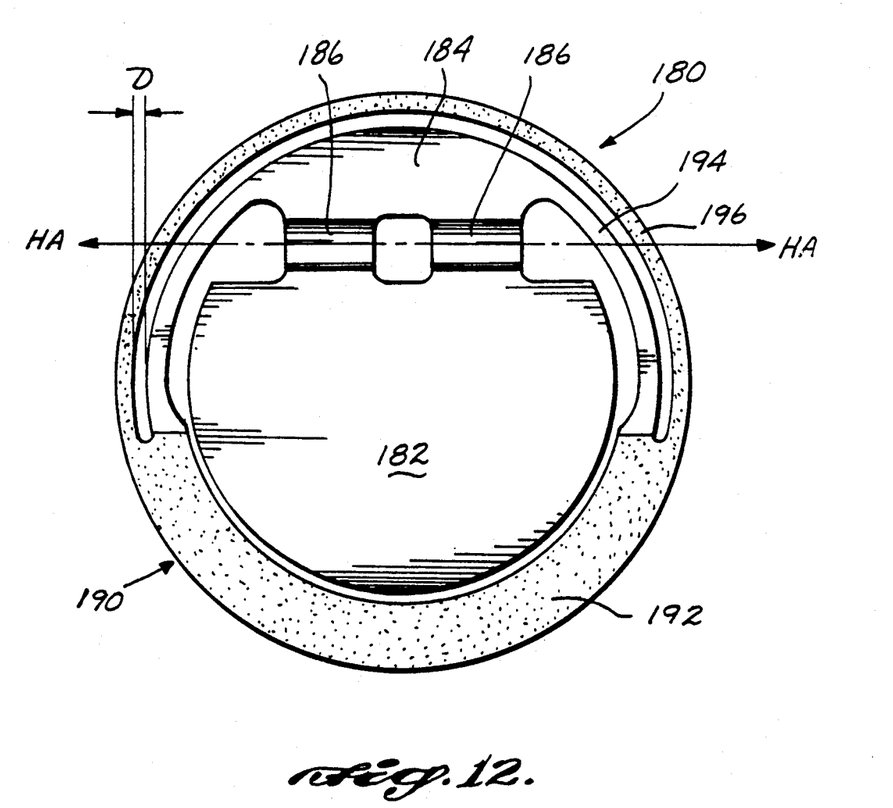
FIG. 12 is a schematic plan view of a sixth embodiment of the invention.

A further embodiment of the invention is partially illustrated in FIG. 12. This embodiment includes proof mass assembly 180 comprising paddle 182 suspended from support ring 190 by flexures 186. Support ring 190 comprises a clamped portion 192 and unclamped portion 194 as in prior embodiments. However, this embodiment also includes restraining ring 196 that extends around unclamped support ring portion 194. Restraining ring 196 preferably has the same thickness as clamped support ring portion 192, such that the restraining ring is secured between the stator and plate along with clamped support ring portion 192. Thus restraining ring 196 provides a rigid restraining member to restrain lateral movement of the unclamped support ring portion 194. Restraining ring 196 is separated radially from unclamped support ring portion 194 via gap D that provides the appropriate shock stop clearance.

Figure 13:
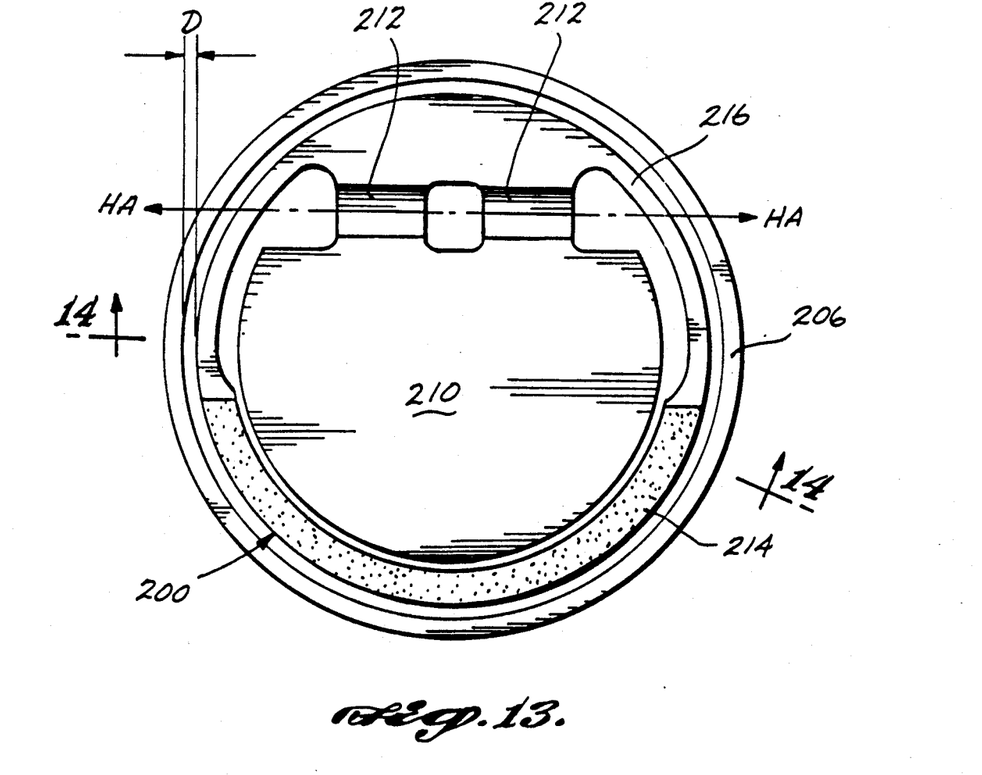
FIG. 13 is a plan view of the proof mass assembly for a seventh embodiment of the invention.
Figure 14:
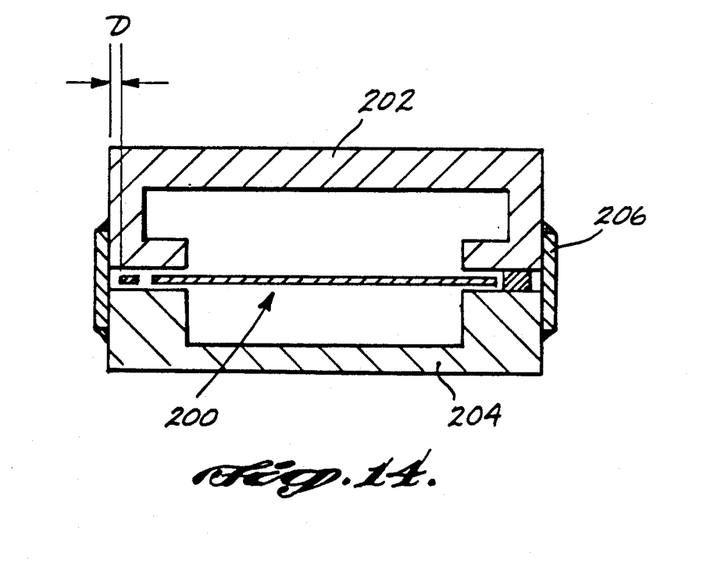
FIG. 14 is a schematic cross-sectional view taken along the line 14—14 of FIG. 13.

A generally similar embodiment is illustrated in FIGS. 13 and 14. This embodiment comprises proof mass assembly 200 suspended between stator 202 and plate 204, the stator and plate being held together by belly band 206. Proof mass assembly 200 includes paddle 210, flexures 212, and a support ring comprising clamped portion 214 and unclamped portion 216. In this embodiment, belly band 206 provides the motion restraint for unclamped support ring portion 216, and the gap (D) between unclamped portion 216 and belly band 206 provides the appropriate clearance.

While the preferred embodiments of the invention have been illustrated and described, variations will be apparent to those skilled in the art. For example, although the invention has been described in the context of an accelerometer having a coil on only one side the paddle, it is equally applicable to dual coil designs, such as those shown in U.S. Pat. No. 3,702,073. The invention may also be applied to accelerometers which do not use force rebalance coils. In particular, the invention is also applicable to an accelerometer in which one or more force sensing elements are connected between the paddle or proof mass and a support structure. Accordingly, the scope of the invention is to be determined by reference to the following claims.

The embodiments of the invention in which an exclusive property or privilege is claimed are defined as follows:

1. An accelerometer for measuring acceleration along a sensing axis, the accelerometer comprising:
   means for mounting a proof mass assembly;
   a proof mass assembly comprising a paddle, a support, and suspension means for suspending the paddle from the support such that the paddle can move along the sensing axis in response to acceleration along the sensing axis, the support comprising an unclamped portion to which the suspension means is attached and a clamped portion mounted to said mounting means; and
   restraining means separate from the clamped portion and spaced from said unclamped portion by a predetermined distance for limiting the travel of the unclamped portion in a direction normal to the sensing axis to a range selected to prevent damage to the proof mass assembly in the event of a shock being applied to the accelerometer.

2. The accelerometer of claim 1, wherein the suspension means suspends the paddle for rotation about a hinge axis normal to the sensing axis, and wherein the restraining means restrains movement of the unclamped portion along the hinge axis.

3. The accelerometer of claim 2, wherein the restraining means comprises a restraining member positioned such that movement of the unclamped portion along the hinge axis causes the unclamped portion to come into contact with the restraining member.

4. The accelerometer of claim 3, wherein the restraining member encircles at least a portion of the unclamped portion, and is physically attached to the clamped portion.

5. The accelerometer of claim 3, further comprising paddle caging means separate from the restraining means and from the support, for limiting the travel of the paddle along the hinge axis.

6. The accelerometer of claim 2, wherein the unclamped portion comprises first and second ends and a central section, the unclamped portion being joined to the clamped portion at the first and second ends, and the suspension means being attached to the unclamped portion at said central section.

7. The accelerometer of claim 1, wherein the mounting means comprises first and second mounting members positioned on opposite sides of the proof mass assembly, and fastening means holding the first and second mounting members together, the fastening means comprising a band encircling the proof mass assembly.

8. The accelerometer of claim 7, wherein the fastening means comprises the restraining means.

9. An accelerometer for measuring acceleration along a sensing axis, the accelerometer comprising:
   means for mounting a proof mass assembly;
   a proof mass assembly comprising a paddle, a support and suspension means for suspending the paddle from the support such that the paddle can move along the sensing axis in response to acceleration along the sensing axis, the support comprising an unclamped portion to which the suspension means is attached and a clamped portion mounted to said mounting means; and
   restraining means separate from the clamped portion for limiting the travel of the unclamped portion in a direction normal to the sensing axis, wherein the mounting means comprises first and second mounting members positioned on opposite sides of the proof mass assembly, and fastening means holding the first and second mounting members together, the fastening means comprising a band encircling the proof mass assembly, and wherein the restraining means comprises a restraining member extending inwardly from the band.

10. An accelerometer for measuring acceleration along a sensing axis, the accelerometer comprising:
    means for mounting a proof mass assembly;
    a proof mass assembly comprising a paddle, a support and suspension means for suspending the paddle from the support such that the paddle can move along the sensing axis in response to acceleration along the sensing axis, the support comprising an unclamped portion to which the suspension means is attached and a clamped portion mounted to said mounting means; and
    restraining means separate from the clamped portion for limiting the travel of the unclamped portion in a direction normal to the sensing axis, wherein the restraining means comprises a restraining member positioned such that movement of the unclamped portion along the hinge axis causes the unclamped portion to come into contact with the restraining member, wherein said unclamped portion includes an opening formed therein, and wherein the restraining means comprises a member extending through said opening.

11. An accelerometer for measuring acceleration along a sensing axis, the accelerometer comprising:
    means for mounting a proof mass assembly;
    a proof mass assembly comprising a paddle, a support and suspension means for suspending the paddle from the support such that the paddle can move along the sensing axis in response to acceleration along the sensing axis, the support comprising an unclamped portion to which the suspension means is attached and a clamped portion mounted to said mounting means; and
    restraining means separate from the clamped portion for limiting the travel of the unclamped portion in a direction normal to the sensing axis, wherein the restraining means comprises a restraining member positioned such that movement of the unclamped portion along the hinge axis causes the unclamped portion to come into contact with the restraining member, and wherein said restraining means comprises first and second members positioned on opposite sides of the unclamped portion along the hinge axis.

12. An accelerometer for measuring acceleration along a sensing axis, the accelerometer comprising:
    means for mounting a proof mass assembly;
    a proof mass assembly comprising a paddle, a support and suspension means for suspending the paddle from the support such that the paddle can move along the sensing axis in response to acceleration along the sensing axis, the support comprising an unclamped portion to which the suspension means is attached and a clamped portion mounted to said mounting means; and
    restraining means separate from the clamped portion for limiting the travel of the unclamped portion in a direction normal to the sensing axis, wherein the restraining means comprises a restraining member positioned such that movement of the unclamped portion along the hinge axis causes the unclamped portion to come into contact with the restraining member, wherein the mounting means comprises first and second mounting members positioned on opposite sides of the proof mass assembly, and wherein the restraining member projects from the first mounting member and encircles at least a portion of the unclamped portion.

* * * * *